July 1, 1969 H. A. PRELLER 3,452,536
CHART DRIVE
Filed Feb. 13, 1967

HUGH A. PRELLER
INVENTOR.

BY

Robert K. Rhea
AGENT

United States Patent Office 3,452,536
Patented July 1, 1969

3,452,536
CHART DRIVE
Hugh A. Preller, 524 NW. 95,
Oklahoma City, Okla. 73114
Filed Feb. 13, 1967, Ser. No. 615,771
Int. Cl. G04c 3/04
U.S. Cl. 58—28                                       3 Claims

ABSTRACT OF THE DISCLOSURE

An electrically powered timepiece including a current direction switching circuit which utilizes magnetic attraction and repulsion forces for driving the balance wheel of a time escapement train of gears.

Background of the invention

This invention relates to a chart driving apparatus and more particularly to a battery powered electromagnetically actuated timepiece.

Chart driving apparatus as used for recording gas pressure and volume usually comprises a circular housing containing a spring driven clockworks. The housing and clockworks are frequently positioned in the field and subjected to the weather and its variations of temperature which results in a failure of the clockworks to provide a means of continuous drive of the chart. The main spring of the clockworks is rewound and the chart changed at various predetermined times which may be each eight hours, each twenty-four hours or weekly. Failure of the clockworks interrupts the information needed to determine the rate of flow and charges for gas delivered.

This invention obviates the unpredictable failure of spring driven timepieces used as a chart driving apparatus by providing a motorless electrically driven timepiece.

Summary of the invention

This invention employs a conventional train of gears or wheels of a clockworks having a chart driving shaft connected with the shaft of the terminal gear of the train of gears. An enlarged balance wheel is connected through a lever actuated ratchet wheel to the driving gear of the clockworks gear train. The balance wheel has mounted thereon a permanent magnet which is reciprocated through the air gap of a horseshoe shaped member wherein coils around this member, energized in sequence with the movement of the permanent magnet by an inverter circuit, forms an electromagnet having opposite poles with respect to the permanent magnet which repulses the permanent magnet to maintain the reciprocating circular movement of the balance wheel. Thus the magnetic attraction of the permanent magnet for the horseshoe member and the timed repulsion of the permanent magnet maintains the chart driving apparatus operative over long periods of time with a minimum of up-keep.

It is therefore the principal object of this invention to provide a motorless electrically energized timepiece which utilizes magnetic attraction and repulsion forces for driving a time escapement train of gears.

Description of the preferred embodiment

Figure 2:
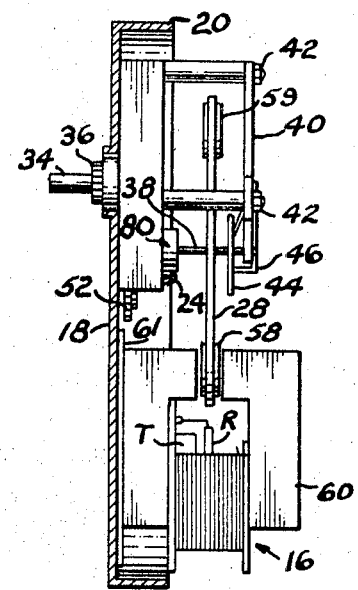
FIGURE 2 is a vertical cross-sectional view, partially in elevation, taken substantially along the line 2—2 of FIG. 1.

The reference numeral 10 indicates the device, as a whole, comprising a frame 12 having a clock mechanism 14 and electric drive means 16 therefor mounted on the frame.

The frame 12 comprises a plate-like base member 18 having an outstanding circular wall 20.

The clock mechanism 14 comprises a pair of plate members 22, only one being shown, which are connected in spaced relation to the frame base 18 by bolts and nuts 24. A driving gear wheel 26 driven by a balance wheel 28, as hereinafter described, is meshed with the adjacent one of a train of cooperatingly meshed gears or wheels 30 in turn in mesh with a clock chart driving gear or wheel 32 having one end of its shaft 34 projecting outwardly through the base plate 18 and including a spur gear 36 which completes the conventional clock chart receiving and driving means. The respective shafts of the time movement gears or wheels 26, 30 and 32, are journaled in a conventional manner by the plates 22.

The balance wheel 28 is flat faced disk-like and is formed of non-magnetic material and is greatly enlarged, diametrically, with respect to a conventional sized balance wheel for the purpose presently explained. The balance wheel 28 is coaxially mounted on a shaft 38 having one end portion journaled by the plate 22, adjacent the base 18, and having its other end portion, opposite the base plate 18, journaled by a back plate 40 which overlies the adjacent plate 22 in paralled spaced relation being secured thereto by bolts and nuts 42. The balance wheel shaft 38 has connected thereto, adjacent the inward surface of the back plate 40, one end of a hair spring 44. The other end of the hair spring is conected to the back plate 40. A "fast" and "slow" time control lever 46, mounted on the back plate 40, has one end portion engageable with the hair spring 44 for advancing and retarding the circular reciprocating movement of the balance wheel in a conventional manner.

The shaft 27 of the driving wheel 26 journals a lever 48, intermediate its ends, which projects beyond the diametric limits of the driving wheel 26. One end of the lever 48 is provided with a spring urged dog 50 which engages ratchet teeth 52 formed on the outer periphery of a ring secured to the inward surface of the driving wheel 26. A cam 54, mounted on the balance wheel shaft 38, contacts and moves the lever 48 so that the dog 50 successively engages the ratchet teeth 52 to rotate the driving wheel 26 in response to the circular reciprocating movement of the balance wheel 28. A spring 56 has one end connected to one of the plates 22 and its other end contacting the end portion of the lever 48, opposite the dog 50 and on that side opposite the cam 54, to maintain the lever in contact with the cam to insure pivoting movement of the lever 48 about the axis of the driving wheel shaft 27. A spring urged pawl 55 prevents return movement of the wheel 26. The balance wheel 28 is equipped with a wafer-like permanent magnet 58 which projects outwardly beyond the plane of the respective flat faces of the balance wheel adjacent an arc of its peripheral edge. The balance wheel is also provided with a similarly shaped nonmagnetic disk 59 of equal mass with respect to the magnet 58 and positioned diametrically opposite the permanent magnet 58 to act as a counterweight.

Figure 5:
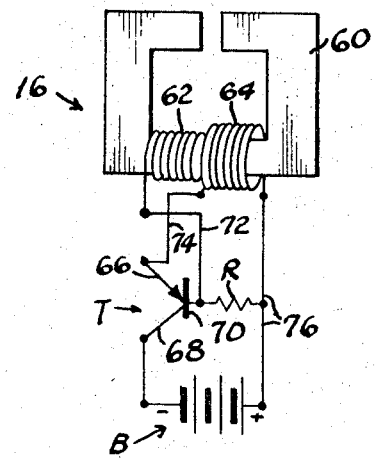
Figure 3:
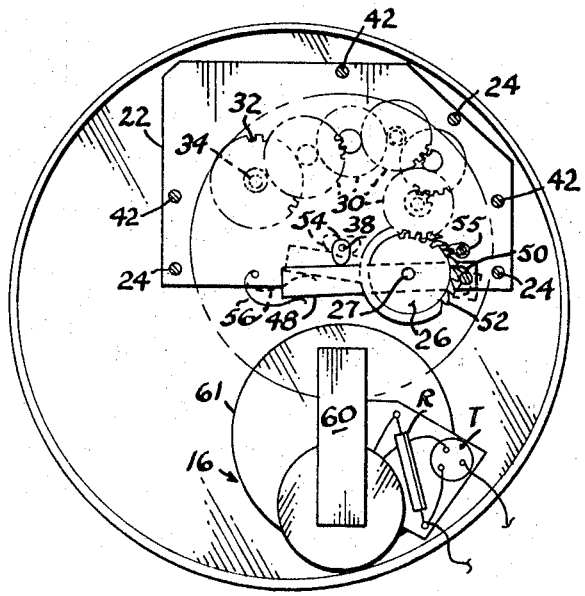
FIGURE 3 is a view similar to FIG. 1 with parts removed to show the sequence of the train of gears forming the time escapement.
Figure 4:
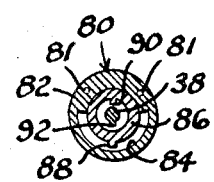
FIGURE 4 is a vertical cross-sectional view of the balance wheel limit stop; and, FIGURE 5 is a wiring diagram.

The electrical drive means 16 comprises a horseshoe shaped member 60 having an air gap slightly greater than the thickness of the permanent magnet 58. The member 60 is positioned edgewise against and electrically insulated by a sheet 61 from the base plate 18 so that the ends of the member, forming the air gap, are disposed on opposing side surfaces of the permanent magnet 58. A coil 62, formed of relatively small wire, is wound around the member 60 opposite its air gap and a coil 64, formed of larger diameter wire than the wire of the coil 62, is connected at one end to one end of the coil 62 and wound around the small wire coil. The two coils are shown diagrammatically in juxtaposed relation (FIG. 5) but in actual practice the low resistance coil 64 overlies the high resistance coil 62. An NPN transistor T has its emitter 66 connected to the juncture defining the connected ends of the coils 62 and 64 by a wire 74. The transistor collector 68 is connected with the negative terminal of a battery B. The base 70 of the transistor T is connected to the other end of the coil 62 by a wire 72. The emitter may thus be considered center tapped to the coils 62 and 64 by the wire 74. A wire 76 connects the other end of the coil 64 to the positive terminal of the battery B. A resistor R is interposed between the transistor base 70 and the wire 76.

The horseshoe shaped member 60 is preferably laminated and is one-half inch square in cross-section. The size and length of the wire of the coil 62 forms a resistance of 375 ohms while the size and length of the wire of the coil 64 forms a resistance of fifteen ohms. The battery B is nine volts dry cell.

*Operation*

In operation the device is assembled and connected with the battery B as described hereinabove. The transistor T acts as a normally "open" switch until "closed" as presently described.

Figure 1:
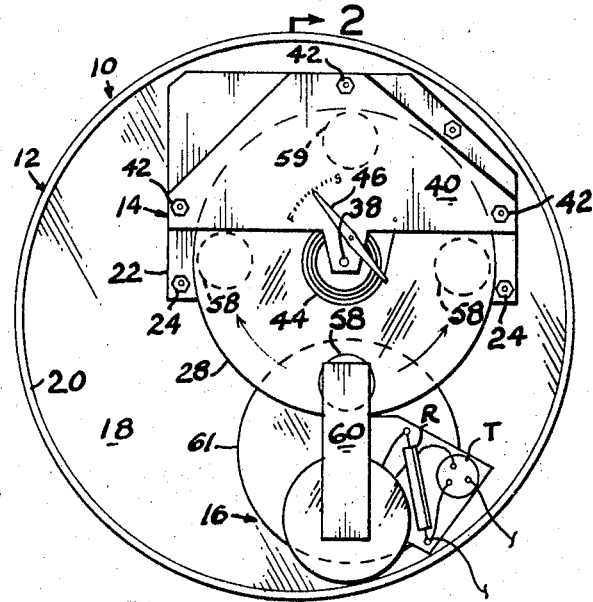
FIGURE 1 is an elevational view of the back side of the device with the cover therefor removed.

Reciprocative movement of the balance wheel 28 is initially started by manually moving the balance wheel 28 to position the wafer magnet 58 in one of the dotted line positions of FIG. 1. When the balance wheel is released, the hair spring 44 returns the magnet 58 toward the air gap of the member 60. The wafer magnet 58 is then attracted by the metal of the member 60 and the instant that the wafer magnet 58 enters the air gap it generates a small current through the coil 62 to the emitter 66 over wire 74 which maintains the transistor T non-conductive. As the permanent magnet passes center of the air gap the polarity of the current through the coil reverses which permits the transistor T, to conduct and apply current to the coils 62 and 64 from the battery B. When the transistor conducts a current flows from the battery B through the coil 64 and transistor T in a direction to form north and south poles for the ends of the member 60 forming the air gap resulting in adjacent like poles with respect to the wafer magnet 58. This repulses the like poles of the wafer magnet and "kicks" the wafer magnet out of the air gap in its previous direction of travel. The resistance of the hair spring 44 overpowers the force of the magnetic repulsion imparted to the wafer magnet and inertia of the balance wheel and returns the wafer magnet toward the air gap in an opposite direction of travel wherein the magnet attraction and polarity cycle is again repeated. The circular reciprocating movement of the balance wheel 28 moves the cam 54 in the same directions of movement thus alternately contacting the adjacent side surface of the lever 48 to repeatedly engage the dog 50 with successive ones of the ratchet teeth 52 which in turn drives the clock wheel gears 30 and chart drive wheel 32.

The continuous to and fro action of the balance wheel 28 eventually generates sufficient inertia to rotate the balance wheel 360° which would result in damage to the hair spring 44. Therefore, a stop must be provided to limit the rotative movement of the balance wheel in each direction to less than 360°. This is accomplished by a stop means 80 surrounding the balance wheel shaft 38 and mounted on one of the plates 22 by pins 81. The stop means 80 comprises a centrally bored cylindrical body 82 having an enlarged substantially semi-circular groove 84 formed inwardly of its outer wall in communication with its bore. An intermediate ring 86 is journaled by the bore of the body 82. The ring 86 is provided with a lug 88 on its outer periphery freely movable within the groove 84. The inner wall of the ring 86 is provided with a detent 90 engageable with a pin 92 secured to the balance wheel shaft 38 within the ring 86. Thus the pin 92 contacts the detent 90 and rotates the ring 86 until the lug 88 reaches one end of the groove 84, thus limiting rotational movement of the balance wheel 28 about its axis in one direction. Rotational movement of the balance wheel in the other direction is limited in an identical but opposite manner.

Obviously the invention is susceptible to some change or alteration without defeating its practicability, and I therefore do not wish to be confined to the preferred embodiment shown in the drawings and described herein.

I claim:

1. In a timepiece having a frame supporting a train of gears connected with a balance wheel; the improvement comprising: a permanent magnet carried by said balance wheel; iron core coil means alternately attracting and repulsing said permanent magnet in sequence with the action of said balance wheel, said iron core coil means including a horseshoe shaped soft iron member mounted on and electrically insulated from the frame, said member having opposing end surfaces disposed adjacent the respective side surfaces of said balance wheel forming an air gap in the path of travel of said permanent magnet; circuit means connecting a source of electrical energy with said member, said circuit means including a high resistance coil wound around a portion of said horseshoe shaped member opposite the air gap; a low resistance coil connected in series with and wound around said high resistance coil; and switch means comprising a transistor interposed in said circuit for completing a current path through at least one of said coils and generating magnetic lines of force across the air gap in response to the movement of said parmanent magnet through the air gap.

2. Structure as specified in claim 1 in which one end of said low resistance coil is connected at one end of said high resistance coil to form a juncture of said coils, said transistor having a base, emitter and collector, said base being connected with the end of said high resistance coil opposite the juncture of said coils, said collector being connected with one terminal of the source of electrical energy, said emitter being connected with the juncture of said coils, the end of said low resistance coil opposite the juncture of said coils being connected with the other terminal of the source of electrical energy.

3. Structure as specified in claim 2 in which said balance wheel includes a mounting shaft; and stop means surrounding the mounting shaft for limiting the movement of said balance wheel to less than 360° in either direction.

References Cited

UNITED STATES PATENTS 3,114,092  12/1963  Maire.
3,134,220  5/1964   Meisner.

FOREIGN PATENTS 307,697    10/1955  Switzerland.
1,404,942  5/1965   France.

RICHARD B. WILKINSON, *Primary Examiner*

E. C. SIMMONS, *Assistant Examiner*